United States Patent
Joung et al.

(10) Patent No.: US 10,102,719 B2
(45) Date of Patent: Oct. 16, 2018

(54) MOBILE TERMINAL AND CONTROL METHOD THEREOF

(71) Applicant: LG ELECTRONICS INC., Seoul (KR)

(72) Inventors: Wonseok Joung, Seoul (KR); Seyoung Lee, Seoul (KR); Jihyun Kim, Seoul (KR); Younggyoo Cho, Seoul (KR); Dami Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/114,357

(22) PCT Filed: Feb. 28, 2014

(86) PCT No.: PCT/KR2014/001691
§ 371 (c)(1),
(2) Date: Jul. 26, 2016

(87) PCT Pub. No.: WO2015/125993
PCT Pub. Date: Aug. 27, 2015

(65) Prior Publication Data
US 2017/0011600 A1    Jan. 12, 2017

(30) Foreign Application Priority Data

Feb. 18, 2014 (KR) .................. 10-2014-0018626

(51) Int. Cl.
*G08B 3/10* (2006.01)
*G08B 21/02* (2006.01)
(Continued)

(52) U.S. Cl.
CPC ......... *G08B 3/1008* (2013.01); *G06F 3/0488* (2013.01); *G06F 3/04847* (2013.01);
(Continued)

(58) Field of Classification Search
CPC ...... G08B 3/1008; G08B 21/02; G08B 5/222; G08B 6/00; G06F 3/0488; G06F 3/04847; H04M 1/72558; H04M 1/72569; H04M 19/044; H03G 3/32; H03G 3/34; G10K 2210/00; H04R 1/1083; H04R 2227/001; H04R 2410/01; H04R 2410/03; H04R 2410/05; H04R 2460/01
See application file for complete search history.

(56) References Cited

U.S. PATENT DOCUMENTS 3,934,085 A * 1/1976 Munson .................. H03G 3/32
381/107
5,239,578 A * 8/1993 Regen .................... H04M 1/19
379/392.01
(Continued)

FOREIGN PATENT DOCUMENTS

JP    2010-128789    6/2010
KR   10-2000-0013731    3/2000
(Continued)

OTHER PUBLICATIONS

International Search Report (with English translation) and Written Opinion dated Nov. 21, 2015 issued in Application No. PCT/KR2014/001691.

*Primary Examiner* — Curtis Kuntz
*Assistant Examiner* — Kenny Truong
(74) *Attorney, Agent, or Firm* — Ked & Associates, LLP

(57) ABSTRACT

A mobile terminal and a control method thereof are disclosed. A mobile terminal according to an embodiment of the present invention comprises: a sound output unit which outputs a sound corresponding to reproduction of a content; a setting unit which includes a plurality of noise blocking levels and sets at least one noise blocking level on the basis of a user input; and a control unit which, when the content is reproduced, blocks surrounding noise according to the set noise blocking level and, when a specific event is detected, adjusts the already set noise blocking level such that the degree of surrounding noise blocking is changed according to the detected specific event.

17 Claims, 10 Drawing Sheets

(51) Int. Cl.
  *G08B 6/00*     (2006.01)
  *G08B 5/22*     (2006.01)
  *G06F 3/0484*   (2013.01)
  *G06F 3/0488*   (2013.01)
  *H04M 1/725*    (2006.01)

(52) U.S. Cl.
  CPC ............... *G08B 5/222* (2013.01); *G08B 6/00* (2013.01); *G08B 21/02* (2013.01); *H04M 1/72558* (2013.01); *H04M 1/72569* (2013.01)

(56) References Cited

U.S. PATENT DOCUMENTS

| | | | | |
|---|---|---|---|---|
| 2009/0097681 | A1* | 4/2009 | Puria | H04R 25/405 |
| | | | | 381/318 |
| 2010/0172510 | A1* | 7/2010 | Juvonen | G10K 11/178 |
| | | | | 381/71.6 |
| 2012/0101819 | A1* | 4/2012 | Heiman | H04R 1/1083 |
| | | | | 704/233 |
| 2012/0281856 | A1* | 11/2012 | Georgiou | G10K 11/178 |
| | | | | 381/94.2 |
| 2013/0006404 | A1* | 1/2013 | Pitkanen | G06F 3/165 |
| | | | | 700/94 |
| 2014/0309549 | A1* | 10/2014 | Selig | H04R 1/1041 |
| | | | | 600/559 |
| 2015/0119741 | A1* | 4/2015 | Zigel | A61B 7/003 |
| | | | | 600/529 |

FOREIGN PATENT DOCUMENTS

| | | |
|---|---|---|
| KR | 10-2010-0035042 | 4/2010 |
| KR | 20-2011-0002574 U | 3/2011 |
| KR | 10-2013-0039267 | 4/2013 |

* cited by examiner

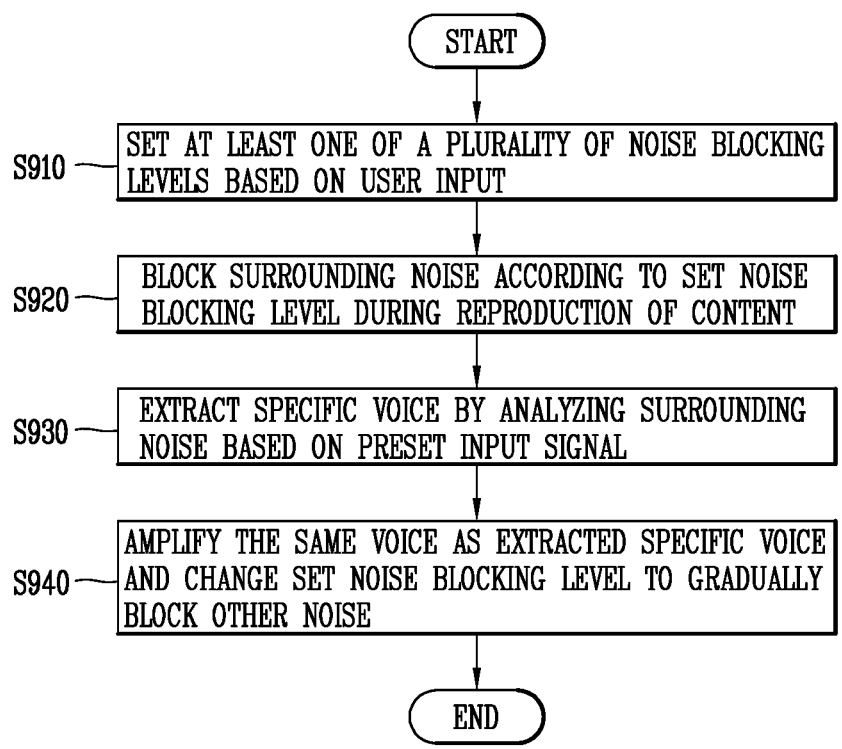

MOBILE TERMINAL AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2014/001691, filed Feb. 28, 2014, which claims priority to Korean Patent Application No. 10-2014-0018626, filed Feb. 18, 2014, whose entire disclosures are hereby incorporated by reference.

BACKGROUND OF THE INVENTION

1. Field of the Invention

This specification relates to a mobile terminal capable of outputting sound, and a method for controlling the same.

2. Background of the Invention

Terminals may be divided into glass type terminals (mobile/portable terminals) and stationary terminals according to their mobility. Also, the glass type terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

Many efforts include not only changes and improvement of structural components implementing a mobile terminal but also software improvement to support and improve functions of the terminal.

Owing to such development, a terminal can simultaneously execute at least two application programs and simultaneously output different sounds in response to the execution of each of the different application programs. Accordingly, a technology of providing only user-desired sound in a selecting manner through muting each of the different sounds.

In addition, the terminal can execute a function of blocking noise coming from outside, so as for the user to concentrate on the sound which is output in response to the execution of the application program. Meanwhile, when the noise coming from outside is continuously blocked while the sound is output through the terminal, the user may be difficult to recognize an unexpected dangerous situation even though the user is exposed to such situation. Also, the user sometimes wants to clearly listen to specific sound or voice even within noise. However, even in that case, blocking noise unselectively is not appropriate for the user's intent.

SUMMARY OF THE INVENTION

Therefore, an aspect of the detailed description of the embodiments of the present invention is to provide a mobile terminal capable of automatically changing a degree of blocking noise according to variations of an external environment while blocking noise at a user-desired degree during reproduction of a content, and a method for controlling the same.

Another aspect of the detailed description of the embodiments of the present invention is to provide a mobile terminal capable of allowing a user to clearly hearing only a specific sound or voice, which the user desires to hear, in a selective manner among locked surrounding noise, and a method for controlling the same.

To achieve these and other advantages and in accordance with the purpose of this specification, as embodied and broadly described herein, there is provided a mobile terminal including an audio output unit which outputs a sound corresponding to reproduction of a content, a setting unit which includes a plurality of noise blocking levels and sets at least one noise blocking level on the basis of a user input, and a control unit which, when the content is reproduced, blocks surrounding noise according to the set noise blocking level and, when a specific event is detected, adjusts the already set noise blocking level such that the degree of surrounding noise blocking is changed according to the detected specific event.

In one exemplary embodiment disclosed herein, the controller may gradually increase or decrease the set noise blocking level on the basis of a type and intensity of a signal corresponding to the detected specific event.

In one exemplary embodiment disclosed herein, the controller may unlock the surrounding noise and turn down a volume of the sound corresponding to the reproduction of the content, when the intensity of the signal corresponding to the detected specific event exceeds a maximum level threshold value of the plurality of noise blocking levels or is smaller than a minimum level threshold value.

In one exemplary embodiment disclosed herein, when the set noise blocking level changes, the controller may control an alarm corresponding to the change to be output.

In one exemplary embodiment disclosed herein, the alarm may be at least one of vibration, a sound, and a message output on the mobile terminal or a screen of an external device connected to the mobile terminal.

In one exemplary embodiment disclosed herein, the specific event may include at least one of a preset gesture input, an input of a specific sound, a change in a degree of surrounding noise, a user's movement, and a change in volume of the sound corresponding to the reproduction of the content. The controller may adjust the set noise blocking level such that a noise blocking degree and range changes according to a degree that the specific event is detected.

In one exemplary embodiment disclosed herein, the plurality of noise blocking levels may be categorized into a plurality of groups each having a different noise blocking degree and range for each level according to a preset reference, and the controller may control a plurality of noise blocking levels corresponding to a selected group to be applied, when the specific event is detected.

In one exemplary embodiment disclosed herein, the audio output module may be a bone conduction speaker. The controller may receive a user's biometric signal through the bone conduction speaker, and change the set noise blocking level into the highest level when it is determined according to the received biometric signal that the user is in a sleep state.

In one exemplary embodiment disclosed herein, the controller may restore the changed noise blocking level into the set noise blocking level when a release of the specific event is detected.

In one exemplary embodiment disclosed herein, when a release of the specific event is detected, the controller may change the noise blocking level into the highest or lowest level, scan an optimal noise blocking level corresponding to a degree of current surrounding noise, and reset a noise blocking level according to the scan result.

In one exemplary embodiment disclosed herein, the setting unit may set a specific sound, a specific voice or a specific word to be excluded from noise blocking, through a user input. The controller may adjust the set noise blocking level to the lowest level or unlock noise when an input of the set specific sound, voice or word is detected.

In one exemplary embodiment disclosed herein, the controller may change the set noise blocking level into a noise blocking level, which is obtained by averaging a noise blocking level corresponding to a first event and a noise blocking level corresponding to a second event, when the detected specific event is in plurality.

In one exemplary embodiment disclosed herein, the controller may change the set noise blocking level into one of a noise blocking level corresponding to a first event and a noise blocking level corresponding to a second event, on the basis of a preset event priority, when the detected specific event is in plurality.

In one exemplary embodiment disclosed herein, the controller may extract a specific voice by analyzing surrounding noise on the basis of a preset input signal, amplify the same voice as the extracted specific voice, and change the set noise blocking level such that the other noise is gradually blocked.

In one exemplary embodiment disclosed herein, the controller may track a sound including a risk factor for a preset time when the detected specific event is the sound including the risk factor. The controller may output a warning alarm or change the set noise blocking level into the lowest level when the sound including the risk factor is getting close according to the tracking result. The controller may maintain the set noise blocking level when the sound including the risk factor is getting away according to the tracking result.

Also, an electronic device according to an exemplary embodiment of the present invention may include a wireless communication unit configured to receive information related to a preset noise blocking level from an external device, and transmit noise information for adjusting the preset noise blocking level to the external device, and a controller. The controller may be configured to block surrounding noise on the basis of the received information related to the noise blocking level, collect information related to the surrounding noise per each preset time, and provide the collected information to the wireless communication unit.

Also, a method for controlling a mobile terminal may include setting at least one noise blocking level of a plurality of noise blocking levels on the basis of a user input, blocking surrounding noise according to the set noise blocking level, when a content is reproduced, and adjusting the set noise blocking level such that a degree of blocking the surrounding noise changes according to a detected specific event, when the specific event is detected.

In one exemplary embodiment disclosed herein, the adjusting the set noise blocking level may be configured to gradually increase or decrease the set noise blocking level on the basis of a type and intensity of a signal corresponding to the detected specific event.

In one exemplary embodiment disclosed herein, the surrounding noise may be unlocked and a volume of a sound corresponding to the reproduction of the content may be turned down, when the intensity of the signal corresponding to the detected specific event exceeds a maximum level threshold value of the plurality of noise blocking levels or smaller than a minimum level threshold value.

In one exemplary embodiment disclosed herein, the method may further include outputting an alarm corresponding to a change upon the change in the set noise blocking level.

EFFECT OF THE INVENTION

A mobile terminal and a method for controlling the same according to the present invention will provide the following effects.

According to at least one of exemplary embodiments of the present invention, while blocking noise at a user-set range and degree during reproduction of a content, when an external environment changes, the set noise blocking range and degree can automatically change to be appropriate for the changed external environment, thereby providing effects of improving user's safety and enhancing user convenience.

Also, according to exemplary embodiments of the present invention, only a specific sound or voice, which a user desired to hear among blocked surrounding noise can be selectively extracted and processed to be clearly heard, thereby providing a noise blocking function better matching a user's complicated intent.

Meanwhile, effects to be obtained in the present invention will not be limited to the aforementioned effects, and other unexplained effects can be obviously understood from the following description by those skilled in the art to which the present invention belongs.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 9 is an exemplary flowchart illustrating another method of controlling a mobile terminal in accordance with the present invention.

DETAILED DESCRIPTION OF THE INVENTION

Figure 1A:
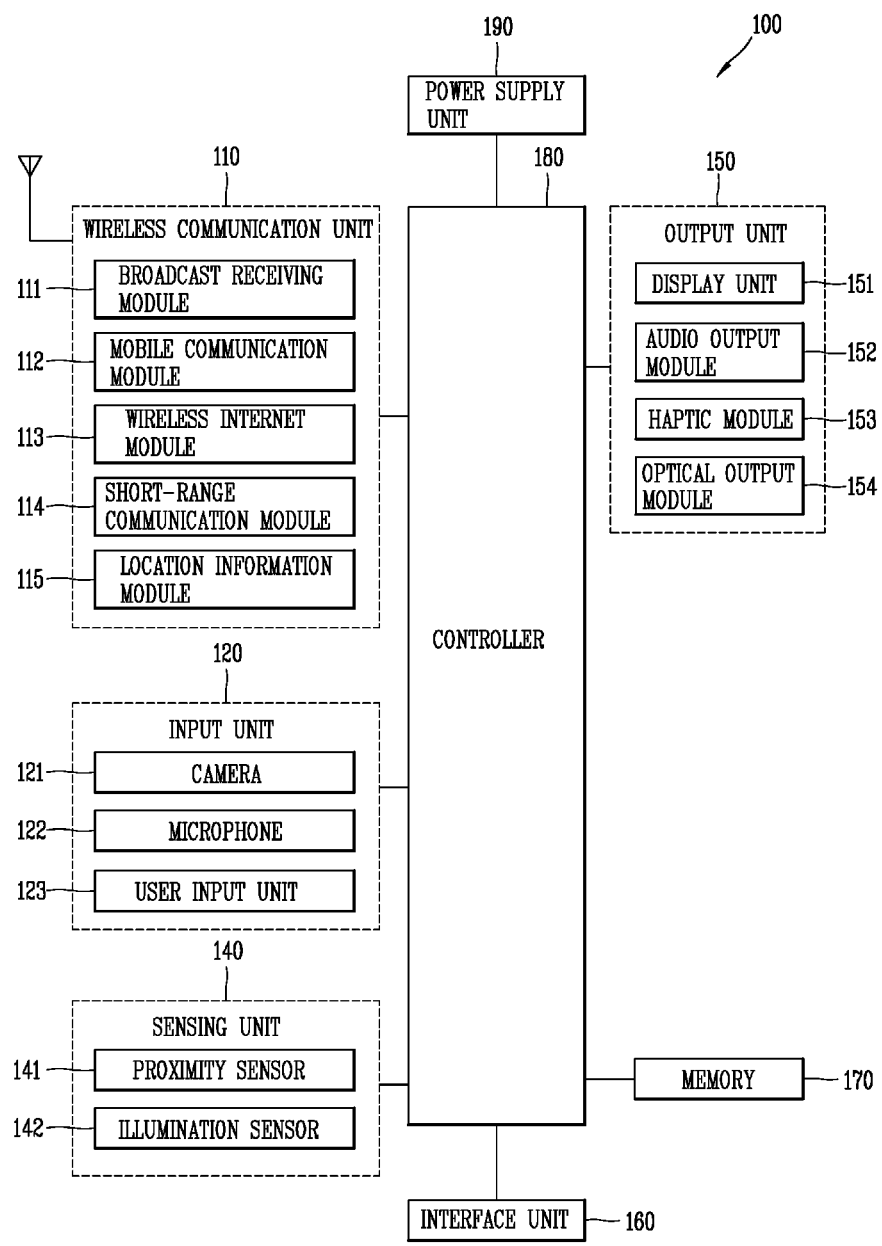
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
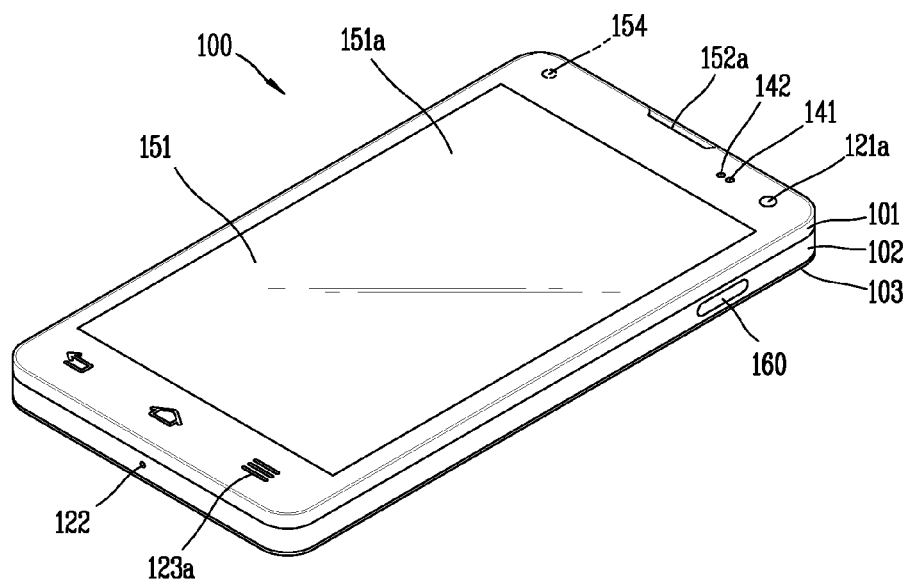
FIGS. 1B and 1C are conceptual views of one example of a mobile terminal according to the present invention, viewed from different directions.
Figure 1C:
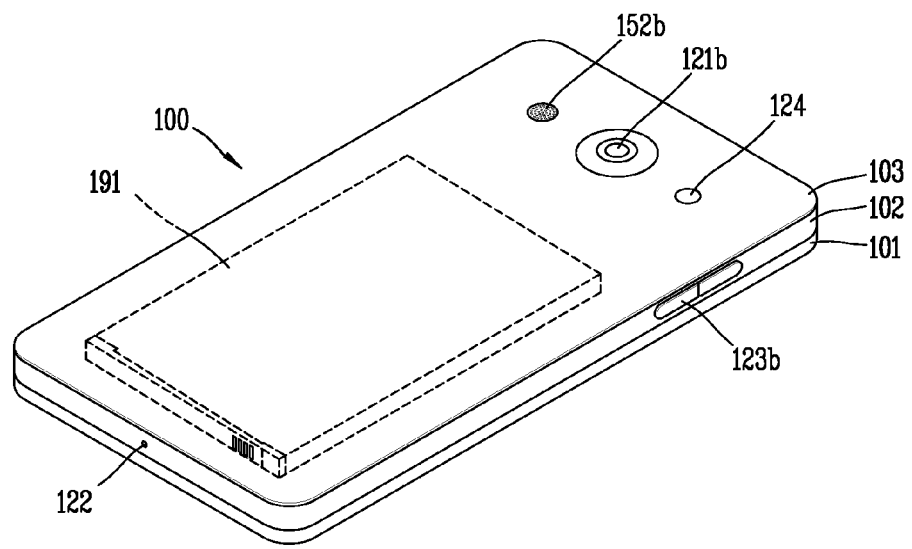

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs (information or signals) to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function (or an application program) being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, new types of user interfaces using the rear input unit can be implemented. Embodiments that include the aforementioned touch screen or the rear input unit may implement some or all of the functionality of the first manipulation unit 123a provided on the front surface of the terminal body. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of a communication system operable with a mobile terminal 100 according to the present invention.

First, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS) (specifically, the Long Term Evolution (LTE) and LTE-advanced (LTE-A), the Global System for Mobile Communications (GSM), and the like).

By way of non-limiting example only, further description will relate to a CDMA communication system, but such teachings apply equally to other system types including an Orthogonal Frequency Division Multiplexing (OFDM) wireless communication system as well as the CDMA wireless communication system.

A CDMA wireless communication system is shown having a plurality of mobile terminals, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1) is typically configured inside the mobile terminal 100 to receive broadcast signals transmitted by the BT.

In addition, the CDMA wireless communication system may be linked to a Global Positioning system (GPS) for checking a position of the mobile terminal 100. Such satellites 300 facilitate locating the position of the mobile terminal 100. Two satellites are depicted but it is understood that useful position information may be obtained with greater or fewer satellites than two satellites. Here, the positioning of the mobile terminal 100 may be carried out by using every positioning technology as well as the GPS positioning technology. Also, at least one of the GPS satellites may alternatively or additionally be configured to provide satellite DMB transmissions.

Hereinafter, embodiments related to a control method which can be implemented in the mobile terminal having such configuration will be described with reference to the accompanying drawings. It can be obvious to those skilled in the art that the present invention can be embodied into other specific forms without departing from the scope and essential features of the present invention.

Figure 2:
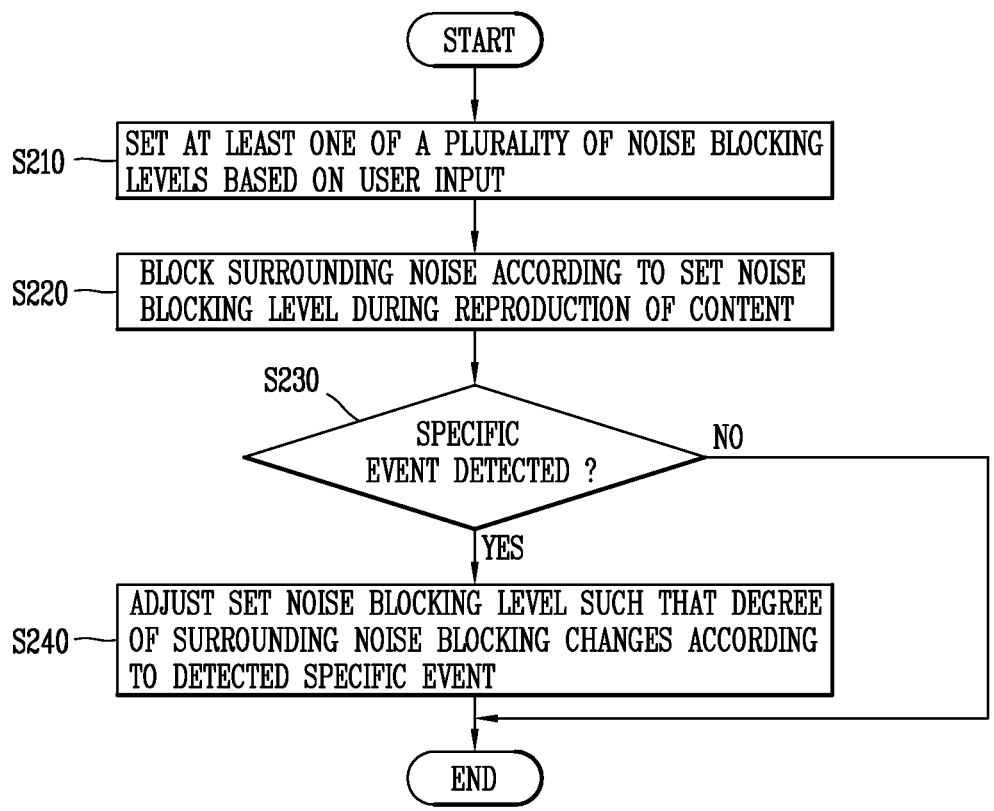
FIG. 2 is an exemplary flowchart illustrating a method of controlling a mobile terminal in accordance with the present invention.
Figure 3:
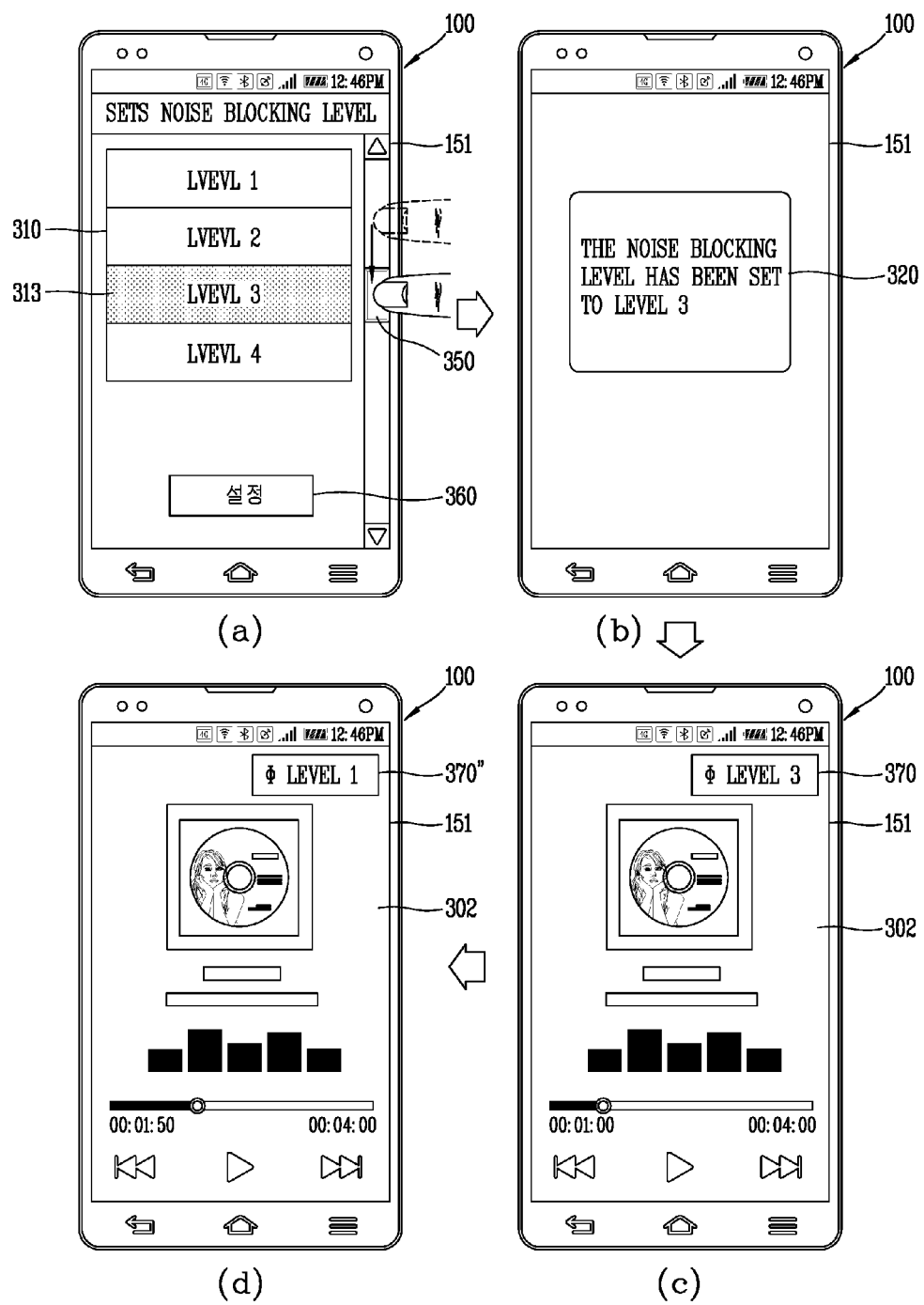
FIG. 3 is a conceptual view illustrating the flowchart of FIG. 2.

Hereinafter, FIG. 2 is an exemplary flowchart illustrating a method of controlling a mobile terminal in accordance with the present invention. And, FIG. 3 is a conceptual view illustrating the flowchart of FIG. 2.

As illustrated in FIG. 2, a mobile terminal according to an embodiment disclosed herein may set at least one noise blocking level of a plurality of noise blocking levels, on the basis of a user input (S210). To this end, the mobile terminal 100 may enter a setting mode for setting a desired specific level of the plurality of noise blocking levels based on a user manipulation.

Here, the plurality of noise blocking levels refer to a group of at least two levels each having a different degree and range of blocking surrounding noise.

Also, the surrounding noise is a concept including every sound, except for sounds corresponding to reproduction of a specific content, among sounds output from the mobile terminal 100, as well as sounds generated from outside, not from the mobile terminal 100. For example, when a plurality of applications outputting different sounds are executed, even sounds corresponding to an execution of other applications except for a specific application may correspond to the surrounding noise. For the latter, the mobile terminal 100 may send a sound control message to the other applications or use a synchronization object provided in an operating system of the mobile terminal 100, in order to mute sounds from the other applications.

In this manner, upon entering the setting mode of the noise blocking level, for example, as illustrated in (a) of FIG. 3, a screen corresponding to the setting mode may be output on the display unit 151 of the mobile terminal 100. That is, a graphic image 310 indicating a plurality of noise blocking levels may be output on one area of the display unit 151, for example, a center of the screen, and a control bar 350 for selecting a specific noise blocking level may also be output on the display unit 151.

Also, a degree and range of blocking noise, which corresponds to each level of the plurality of noise blocking levels may be implemented in various manners. For example, as illustrated in (a) of FIG. 3, Level 1 may be a level of blocking the least of surrounding noise or rarely blocking the surrounding noise, Level 2 may be a level at which a degree of blocking the surrounding noise increases more than Level 1 by a predetermined range. Also, Level 3 may be a level of blocking every surrounding noise except for specific sound, and Level 4 may be a level of completely blocking the surrounding noise (i.e., noise may be 0 dB). Also, fewer or greater noise blocking levels than those illustrated in (a) of FIG. 3 may be implemented. A plurality of noise blocking levels having degrees and ranges of noise blocking, which are different from those of the noise blocking levels illustrated in (a) of FIG. 3 in view of a spaced degree between neighboring levels.

On the screen corresponding to the setting mode illustrated in (a) of FIG. 3, a user may set a specific noise blocking level 312 in the mobile terminal 100, in a manner of moving to a noise blocking level desired to set by moving a moving element of the control bar 350 and then applying a touch to a 'Set' icon 360 or applying a preset touch input, for example, a long-touch input to the specific noise blocking level 312.

When the specific noise blocking level 312 is set, as illustrated in (b) of FIG. 3, a message 320 notifying the set noise blocking level 312, for example, a message like 'The noise blocking level has been set to Level 3' may be popped up on the display unit 151.

Then, the mobile terminal 100 may perform reproduction corresponding to an execution of at least one content application from which sounds can be output. During the reproduction of the content, the mobile terminal 100 may block surrounding noise according to the preset noise blocking level (S220). Accordingly, the user can more clearly hear the sounds corresponding to the reproduction of the content.

For example, as illustrated in (c) of FIG. 3, when a sound source listening application is executed, a screen 302 corresponding to the execution of the application is output, and surrounding noise is blocked according to the noise blocking level, which has been preset through the process illustrated in (a) and (b) of FIG. 3, in response to reproduction of a sound source. In this instance, visual information indicating whether or not noise blocking has been set and a set noise blocking level may be output in a form of an icon 370 on one area of the screen 302.

For example, as the noise blocking level of the mobile terminal 100 is set to Level 3 in (a) and (b) of FIG. 3, every noise may be blocked except for specific sounds, for example, an announcement broadcast, a conversation voice within a predetermined area, a voice prestored in the mobile terminal 100, a voice naming the user, and the like, while a music content is reproduced.

Meanwhile, the controller 180 of the mobile terminal 100 may detect a generation of a preset specific event during the reproduction of the content (S230). To this end, the controller 180 may receive a sensor value, which is detected through the sensing unit 140 of the mobile terminal 100, surrounding environment information input through the microphone 122 and the camera 121, and location information detected through the location information module 110. The controller 180 may then use the received information for determining a generation or non-generation of a specific event.

Here, the preset specific event may include at least one of a preset gesture input, an input of a specific sound, a change in a degree of surrounding noise, a user's movement, and a change in volume of the sound corresponding to the reproduction of the content.

Also, the preset gesture input refers to a user's gesture operation for changing the preset noise blocking level according to a preset level unit (e.g., by two levels). The gesture operation may include various gestures according to the user's motions made by fingers, wrists, shoulders, a head portion, legs, a waist, and the like. To this end, the controller 180 of the mobile terminal 100 may decide an input or non-input of a preset gesture by analyzing image information captured through a motion sensor, a terrestrial magnetism sensor, an acceleration sensor, a gyro sensor and the like, which are included in the sensing unit 140, and the camera 121.

For example, when the user applies a gesture input of moving a forefinger to a lip, the mobile terminal 100 may detect a generation of an event corresponding to a control command for increasing the preset noise blocking level. Similar to this, when the user applies a gesture input of moving a palm of a hand to an ear, the mobile terminal 100 may detect a generation of an event corresponding to a control command for decreasing the preset noise blocking level.

Also, for example, when the user moves from a seat while listening to sounds corresponding to the reproduction of the specific content through the mobile terminal 100 without a motion (e.g., in a sitting position), the mobile terminal 100 may detect the user's movement as a generation of a specific event. In this instance, the mobile terminal 100 may prestore a reference value corresponding to a user's movement for detecting the movement as a generation of a specific event in the memory 170. In this instance, the controller 180 may also detect the generation of the specific event only when a sensed value exceeds the prestored reference value.

As another example, when the surrounding noise detected in the mobile terminal 100 suddenly increases, the mobile terminal 100 may detect the change in the noise as the generation of the specific event. An example of the change in such surrounding environment may be a case where the user moves to another place or a case where a specific situation such as conference or class is ended.

Also, the controller 180 may differently decide whether or not the specific event has been generated, on the basis of a degree and range of blocking noise, which corresponds to the preset noise blocking level. For example, when the preset noise blocking level is set to the highest level (or maximum level), even though specific noise, such as a far away sound, an announcement broadcast, a conversation voice within a predetermined area, a prestored voice in the mobile terminal 100, a voice naming the user or the like, is generated, it may not be decided as the generation of the specific event. However, even when the preset noise blocking level is set to the highest level, noise associated with a dangerous situation may be detected as the generation of the specific event.

The controller 180 may differently decide whether or not the specific event has been generated, on the basis of location information related to the mobile terminal 100, which is detected through the location information module 115. That is, the controller 180 may differently detect the generation or non-generation of the specific event by recognizing a characteristic of a place where the mobile terminal 100 is currently located. The controller 180 may differently detect a generation or non-generation of an event for changing the preset noise blocking level, according to a case where the current location of the mobile terminal 100 is a place which the user frequently visits, a case where the current location of the mobile terminal 100 is an unfamiliar place without history information, or a case where the current location of the mobile terminal 100 matches a preset place such as a library, an office, a school, a home or a church. For example, when the current location of the mobile terminal 100 is 'library', the mobile terminal 100 may increase or reduce a range of deciding the generation of the event by considering that the library is a place where noise is rarely generated.

The controller 180 may also differently decide whether or not the specific event has been generated, on the basis of current time information. For example, when a time slot corresponding to current time information is a daytime, the controller 180 may more tighten the degree and range of deciding the current situation as the generation of the event by considering that more noise is generated during daytime. That is, faraway noise or slight noise may not be considered as the generation of the specific event. On the other hand, when a time slot corresponding to current time information is a nighttime, the controller 180 may alleviate the degree and range of an event considered as the generation of the specific event, by considering that surrounding noise is less generated.

When the specific event is detected, the mobile terminal 100 may adjust the preset noise blocking level such that the degree of blocking the surrounding noise can be changed according to the detected specific event (S240). That is, the controller 180 may adjust the preset noise blocking level such that the degree and range of blocking noise can be changed according a degree that the specific event is detected.

In detail, when it is determined according to the sensing result of the specific event that the user is under an environment with high risk, the controller 180 may degrade the preset noise blocking level down to a specific level or more. This may allow the user to obviously recognize surrounding noise corresponding to the risk even during the reproduction of the content.

On the other hand, when it is determined according to the sensing result of the specific event that the user is under an environment with low risk and allowing concentration on the reproduction of the content, the controller 180 may raise the preset noise blocking level up to a specific level or more. Accordingly, the user can more concentrate on the reproduced content.

In this manner, when the preset noise blocking level is changed in response to the generation of the specific event, as illustrated in (d) of FIG. 3, visual information 370" which indicates the change and the changed noise blocking level may be output on one area of the display unit 151. As illustrated in (c) and (d) of FIG. 3, when it is determined that the user is under an environment with high risk (e.g., when the user is currently moving or crossing a road), it can be noticed that the preset noise blocking level has automatically changed from Level 3 to Level 1.

Also, the controller 180 of the mobile terminal 100 may gradually increase or decrease the preset noise blocking level on the basis of type and intensity of a signal corresponding to the specific event detected in the step S230. As such, when the preset noise blocking level is gradually changed according to the generation of the specific event, it can be prevented that the user is embarrassed by suddenly hearing surrounding noise.

Here, the type and intensity of the signal corresponding to the specific event, for example, corresponds to a type and intensity of changed noise when the specific event is the change of the surrounding noise. For example, when the user moves from a quiet plate to a noisy place, the controller 180 may change the preset noise blocking level to be proportional to intensity of surrounding noise corresponding to the moved place. That is, as the surrounding noise increases, the preset noise blocking level may be raised.

Meanwhile, the controller 180 may lower a noise blocking level for a preset time by considering an occurrence of a dangerous situation while the user moves to another place. For example, the controller 180 may lower the preset noise blocking level or change the preset noise blocking level to the lowest level while the user having/wearing the mobile terminal 100 moves from the quiet place to the noisy place, thereby preventing an occurrence of a risk due to blocking of noise (e.g., a sound that a car is getting close, another user's voice notifying a risk, or the like) during the movement. And, the controller 180 may readjust the noise blocking level to be proportional to intensity of surrounding noise after a lapse of the preset time.

When the detected specific event is a sound including a risk factor, the controller 180 may track the sound including the risk factor for a preset time.

When the sound including the risk factor is getting close to the user according to the tracking result, the controller 180 may output a warning alarm or change the preset noise blocking level to the lowest level. Here, the warning alarm may be output through the audio output module 152 in the form of a preset signal sound or a notification voice. On the other hand, when the sound including the risk factor is getting away from the user according to the tracking result, the controller 180 may maintain the preset noise blocking level.

Also, when the specific event detected in the step S230 is in plurality, the controller 180 may change the preset noise blocking level to a selected noise blocking level according to a preset reference.

For example, when the detected specific event is in plurality, the controller 180 may calculate an average noise blocking level between a noise blocking level corresponding to a first event and a noise blocking level of a second event, and then change the preset noise blocking level to the calculated average noise blocking level. For example, when the first event is a user's motion and the second event is an announcement broadcast, the controller 180 may change the preset noise blocking level to a noise blocking level which is acquired by averaging a noise blocking level of the user's motion and a noise blocking level corresponding to the announcement broadcast.

As another example, when the detected specific event is in plurality, the controller 180 may change the preset noise blocking level to one of a noise blocking level corresponding to a first event and a noise blocking level corresponding to a second event on the basis of a preset event priority. Here, the preset event priority may be set through a user input or automatically set for an event which is determined as an emergency. For example, when the first event is a user's motion and the second event is a voice that another person calls the user, the controller 180 may change the preset noise blocking level to a noise blocking level corresponding to the second event with a high preset event priority.

As described, according to the present invention, during the reproduction of the content, noise may be blocked at a user-set degree and range, and when an external environment changes, the range and degree of blocking noise may automatically change to be appropriate for the changed external environment, thereby enhancing the user's safety for a risk and improving user convenience.

The foregoing description has been given of the method of automatically changing the preset noise blocking level according to the generation of the specific event. Hereinafter, a method of changing a noise blocking level according to a release of a specific event will be described.

Figure 4:
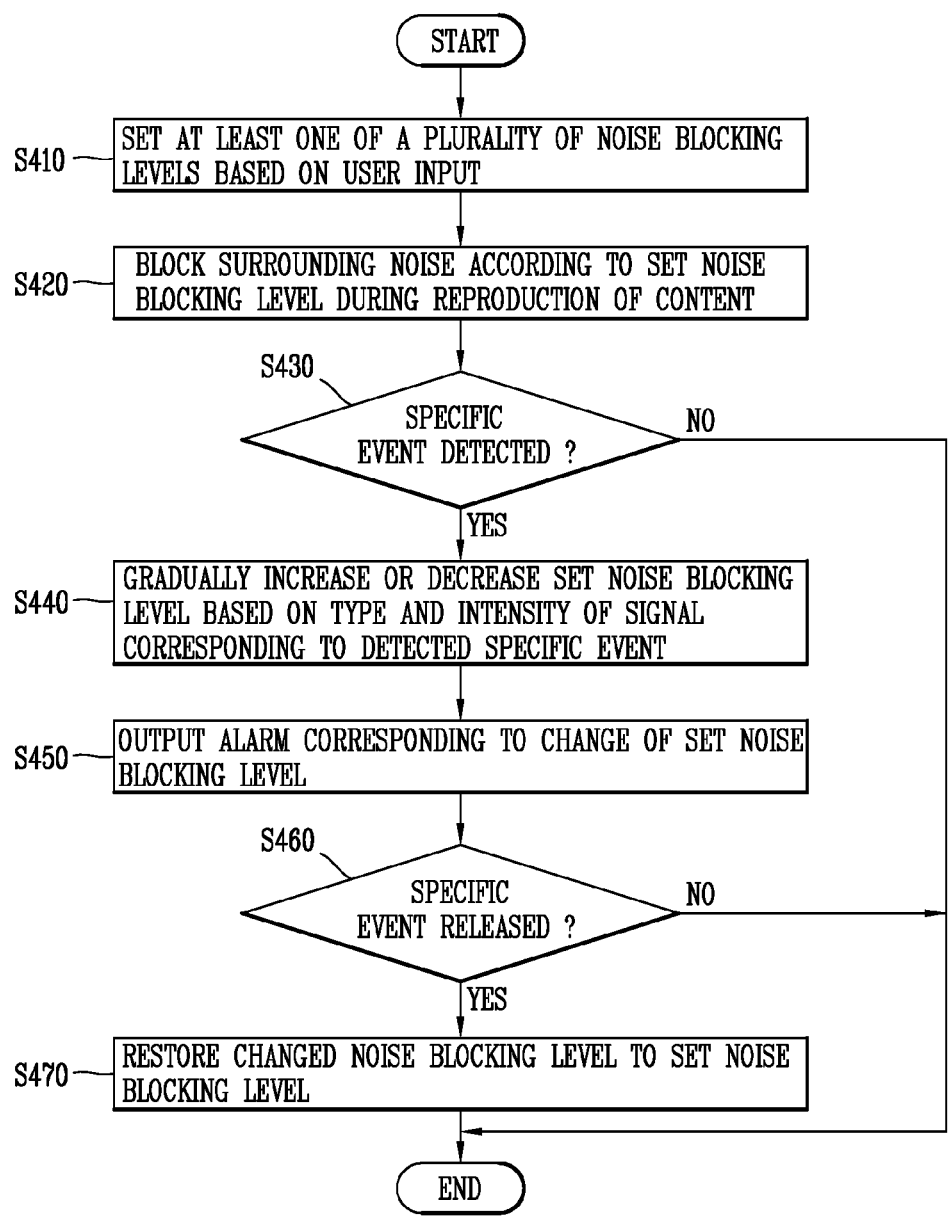
FIG. 4 is an exemplary flowchart illustrating another method of controlling a mobile terminal in accordance with the present invention.
Figure 5:
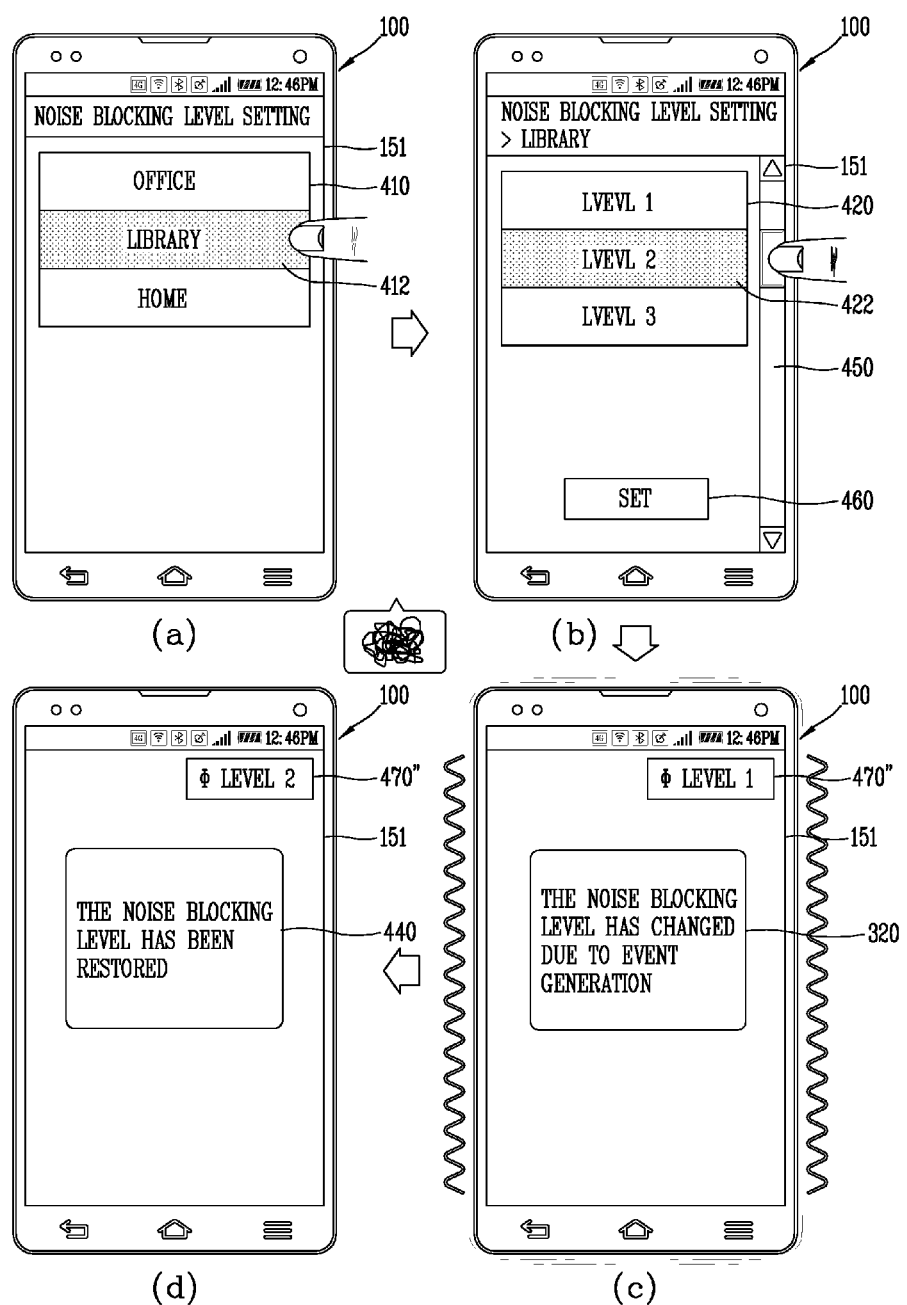
FIG. 5 is a view illustrating the flowchart of FIG. 4.

FIG. 4 is an exemplary flowchart illustrating another method of controlling a mobile terminal in accordance with the present invention, and FIG. 5 is a view illustrating the flowchart of FIG. 4.

As illustrated in FIG. 4, the mobile terminal 100 according to the embodiment of the present invention may set at least one noise blocking level of a plurality of noise blocking levels on the basis of a user input (S410). As a precondition for this, the mobile terminal 100 may enter a setting mode for setting a desired specific level among the plurality of noise blocking levels based on a user manipulation.

Here, the plurality of noise blocking levels refer to a group of at least two levels which are different from each other in degree and range of blocking surrounding noise.

Also, the plurality of noise blocking levels may be categorized into a plurality of groups of levels each having a different noise blocking degree and range. In this instance, the plurality of groups according to a preset reference may be categorized based on a place, a location or a user setting, and a plurality of noise blocking levels may be divided into a plurality of groups according to a selected reference. Also, each group may include a different number of noise blocking levels.

For example, as illustrated in (a) and (b) of FIG. 5, upon entering the setting mode of the noise blocking level, a menu screen 410 for grouping a plurality of noise blocking levels on the place basis is output on the display unit 151 of the mobile terminal 100.

When the user selects a specific place item 412 on the menu screen 410 illustrated in (a) of FIG. 5, a screen 420 including a plurality of noise blocking levels which can be set for the selected item is output. The user may set a desired noise blocking level, namely, Level 2, by applying a preset touch to a specific noise blocking level 422 on the corresponding screen 420 or applying a touch input to a setting icon 460 after moving a moving element of the control bar 450.

When the specific noise blocking level is set, the mobile terminal 100 may block surrounding noise according to the set noise blocking level during reproduction of a content (S420). Here, the preset specific event may include at least one of a preset gesture input, an input of a specific sound, a change in a degree of surrounding noise, a user's movement, and a change in volume of the sound corresponding to the reproduction of the content.

In addition, while the content is reproduced, the mobile terminal 100 may detect a generation of a preset specific event during the reproduction of the content (S430). Meanwhile, when the plurality of noise blocking levels are grouped into a plurality of groups, the controller 180 may differently apply a reference corresponding to an event generation for each group.

Then, when the specific event is detected, the mobile terminal 100 may gradually increase or decrease the preset noise blocking level on the basis of a type and intensity of a signal corresponding to the detected specific event (S440).

In detail, when it is determined according to the sensing result of the specific event that the user is under an environment with a high risk, the controller 180 may degrade the preset noise blocking level down to a specific level or more. On the other hand, when it is determined according to the sensing result of the specific event that the user is under an environment with a low risk and allowing concentration on the reproduction of the content, the controller 180 may raise the preset noise blocking level up to a specific level or more. Meanwhile, when a plurality of noise blocking levels are grouped into a plurality of groups, the controller 180 may control a plurality of noise blocking levels corresponding to a pre-selected group to be applied upon the detection of the specific event.

When the preset noise blocking level is changed, the controller 180 may output a predetermined alarm corresponding to the change of the preset noise blocking level.

Here, the alarm may include at least one of vibration, a sound and/or a message output on the mobile terminal 100 or a screen of an external device connected to the mobile terminal 100.

For example, as illustrated in (c) of FIG. 5, when a preset event generation, for example, a user's motion is detected, a predetermined message window 430 such as "The noise blocking level changes in response to an event generation" is popped up on one area, for example, a central area of the display unit 151 of the mobile terminal 100, and simultaneously an icon 470 indicating the change and the changed noise blocking level is displayed on another area, for example, an upper right area of the display unit 151. In addition to these, a predetermined vibration may be output on the terminal body of the mobile terminal 100, and although not illustrated, a predetermined signal sound or a preset announcement voice may also be output through the audio output module 152 (or a connected headset).

Also, when the alarm is output in the form of sound and the audio output module 152 of the mobile terminal 100 is connected with an earphone, the alarm signal may be output through one side earphone corresponding to one ear.

Meanwhile, after the generation of the specific event, the mobile terminal 100 may further detect a release of the event. To this end, the controller 180 may determine whether or not a generated specific event has been released, by receiving a sensor value sensed through the sensing unit 140, surrounding environment information received through the camera 121, and location information detected through the location information module 110.

Here, the release of the generated event may include at least one of a gesture input opposite to the preset gesture input determined as the event generation, a lapse of a preset time after an input of a specific sound, a change in a degree of surrounding noise, a non-detection of a user's motion for a predetermined time, fixing a volume corresponding to the reproduction of the content or pausing the reproduction for a predetermined time. That is, the release of the generated event may include a return to the same or similar condition to that before the event generation or a non-detection of a change for a preset time after the event generation.

When the release of the specific event is detected, the controller 180 may restore the changed noise blocking level to the preset noise blocking level.

For example, as illustrated in (d) of FIG. 5, when the release of the generated event, for example, a user's stop while moving is detected, the mobile terminal 100 restores a noise blocking level to the noise blocking level, namely, Level 2, which has been set in the setting mode of (a) and (b) of FIG. 5. The controller 180 then outputs a message notifying the change in the noise blocking level, for example, a message 440 such as 'The noise blocking level has been restored' on a central area of the display unit 151. Along with this, an icon 470" indicating the release of the event and the noise blocking level changed in response to the release may also be output on one area, for example, an upper right area of the display unit 151.

Also, when the release of the specific event is detected, the controller 180 may control the noise blocking level to be reset according to a degree of surrounding noise. In detail, when the release of the specific event is detected, the controller 180 may change the noise blocking level into the highest or lowest level, scan an optimal noise blocking level corresponding to the degree of current surrounding noise, and then set a new noise blocking level corresponding to the scan result.

As such, in the embodiment of the present invention, upon a release of a generated event, such as a settlement of a risk, a noise blocking level can be restored to an originally-set noise blocking level or reset to a noise blocking level appropriate for a new environment, thereby helping the user to concentrate on the sound of the content again.

Hereinafter, description will be given of a method for controlling a mobile terminal when a signal corresponding to a detected specific event exceeds a reference value or is generated within a reference range or the signal matches a user setting value.

Figure 6:
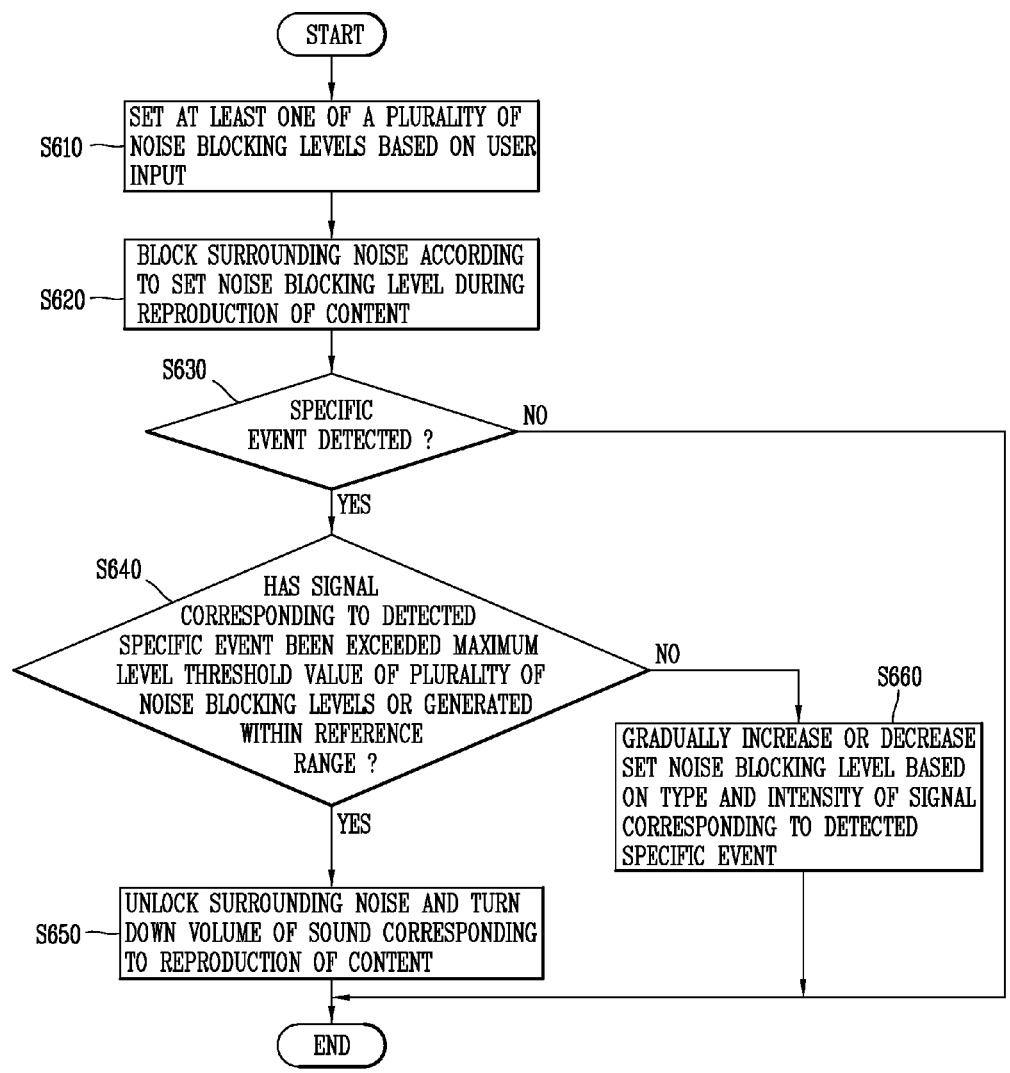
FIG. 6 is an exemplary flowchart illustrating another method of controlling a mobile terminal in accordance with the present invention.

First, FIG. 6 is a flowchart illustrating a control method for a mobile terminal in case where a signal corresponding to a detected specific event exceeds a reference value or is generated within a reference range.

As illustrated in FIG. 6, the mobile terminal 100 according to the embodiment disclosed herein may set at least one noise blocking level of a plurality of noise blocking levels based on a user input (S610). To this end, the mobile terminal 100 may enter a setting mode for setting a desired specific level on the basis of a user manipulation. When the specific noise blocking level is set, the mobile terminal 100 may block surrounding noise according to the preset noise blocking level during reproduction of a content (S620).

Meanwhile, the controller 180 of the mobile terminal 100 may detect a generation of a preset specific event during the reproduction of the content (S630). Here, the preset specific event may include at least one of a preset gesture input, an input of a specific sound, a change in a degree of surrounding noise, a user's movement, and a change in volume of the sound corresponding to the reproduction of the content.

Also, the controller 180 may determine whether or not a signal corresponding to the detected specific event exceeds the maximum level threshold value of the plurality of noise blocking levels. Or, the controller 180 may determine whether or not a signal corresponding to the detected specific event has been generated within a reference range (S640).

Here, exceeding the maximum level threshold value refers to surrounding noise, sound or the like which is not within a noise blocking degree and range corresponding to the maximum level of the plurality of noise blocking levels. In this instance, noise may not be completely blocked but such noise may be likely to be sounds associated with a dangerous situation. Therefore, a user's verification or check may be required.

Here, the case where the signal corresponding to the event is generated within the reference range may be a case where another user or person located nearby attempts to talk to the user, for example, asking directions or asking a question. Even in this case, the noise blocking level should automatically be controlled in order to chat with the another user. To this end, the mobile terminal 100 may analyze hauling and a noise value of the another user's input voice, and schematically detect a distance between the mobile terminal 100 and the another user according to the analysis result.

Meanwhile, when it is determined in the step S640 that the signal corresponding to the detected specific event exceeds the maximum level threshold value of the noise blocking levels or has been generated within the reference range, the controller 180 may unlock the surrounding noise and reduce a volume of the sound corresponding to the reproduction of the content (S650).

That is, the surrounding sounds can be more clearly recognized by unlocking the noise and lowering the volume of the content (or pausing the reproduced content). Accordingly, the signal corresponding to the specific event, the surrounding sounds such as an occurrence of a risk or another user's attempt to talk can be clearly heard.

On the other hand, when it is determined in the step S640 that the signal corresponding to the detected specific event is lower than the maximum level threshold value of the noise blocking levels or is not generated within the reference range, the controller 180 may gradually increase or decrease the preset noise blocking level on the basis of a type and intensity of the signal corresponding to the detected specific event (S660).

Figure 7:
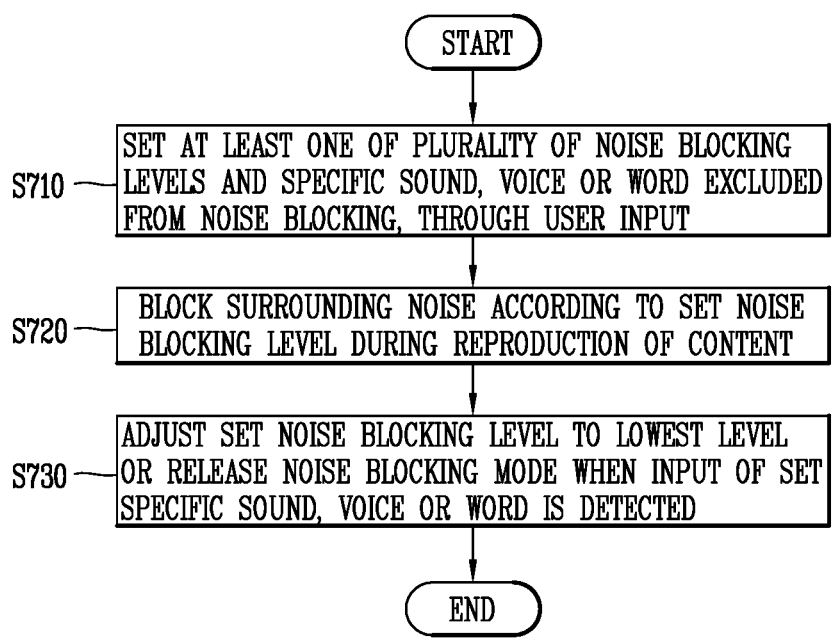
FIG. 7 is an exemplary flowchart illustrating another method of controlling a mobile terminal in accordance with the present invention.

FIG. 7 is a flowchart illustrating a method of controlling a mobile terminal in case where a signal corresponding to a detected specific event matches a user setting value.

As aforementioned, a setting unit 181 of the mobile terminal 100 may set at least one noise blocking level of a plurality of noise blocking levels on the basis of a user input. Also, the setting unit 181 may set a specific sound, voice or word which is to be excluded upon blocking noise (S710). To this end, the mobile terminal 100 may enter a setting mode for setting a desired specific level on the basis of a user manipulation, and set the specific noise blocking level and the specific sound or voice to be excluded upon blocking the noise.

Here, setting the specific sound, voice or word excluded upon blocking the noise may be executed by activating a recording function included in the mobile terminal 100. Or, a list or icon for setting a sound or voice prestored in the mobile terminal 100 as the specific sound or voice to be excluded upon blocking the noise may be exposed to a screen. Accordingly, the prestored sound or voice can be set as the specific sound or voice excluded upon blocking the noise, in response to a touch applied to the exposed list or icon.

When the specific noise blocking level is set, the mobile terminal 100 may block surrounding noise according to the preset noise blocking level upon reproducing a content (S720). Also, the mobile terminal 100 can continuously monitor whether or not the specific sound, voice or word preset in the noise blocking mode is input.

Then, when the input of the preset specific sound, voice or word is detected, the controller 180 of the mobile terminal 10 may adjust the preset noise blocking level to the lowest level or release the noise blocking mode. Accordingly, for example, when a prestored warning sound (e.g., a horn of a car) or another person's voice (specific voice) is heard nearby, or a voice calling the user (specific word) is heard, the user can recognize it and deal with it.

Meanwhile, the setting of the noise blocking level and the blocking of the noise corresponding to the noise blocking level which have been described in the foregoing embodiments may be executed in different devices. To this end, an electronic device, for example, a Bluetooth device may perform wired/wireless communication, for example, short-range communication such as WiFi communication or Bluetooth communication with at least one external device, for example, the mobile terminal 100.

Figure 8:
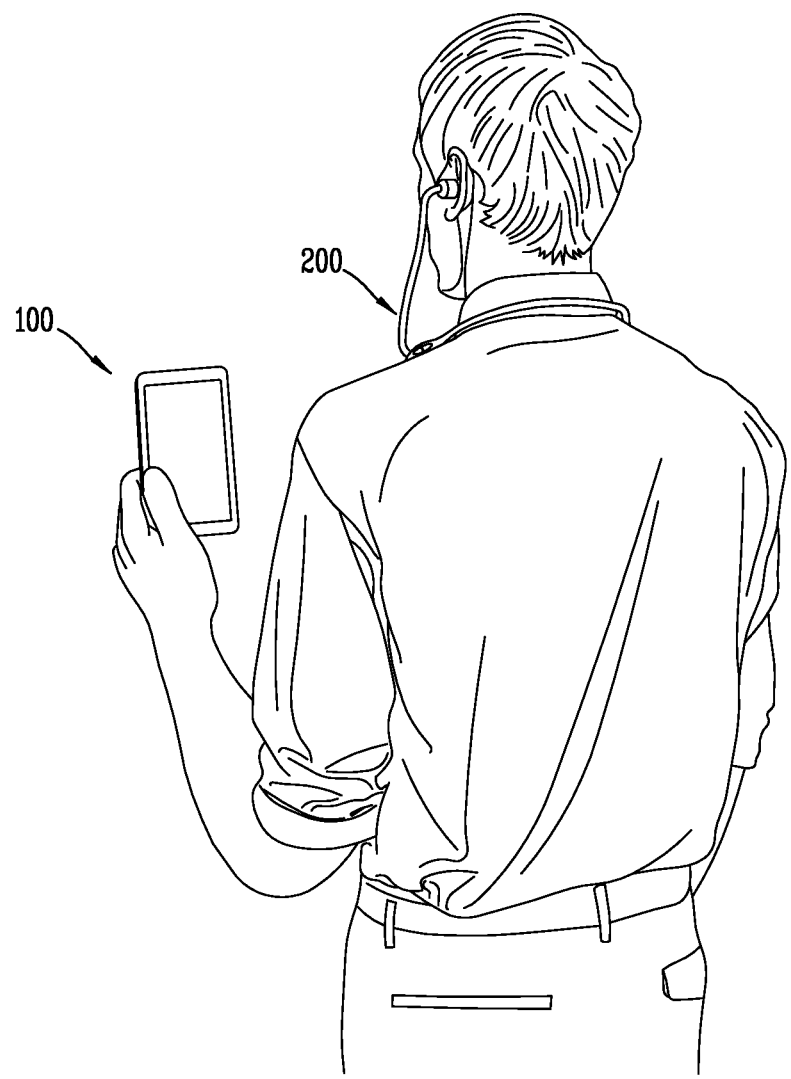
FIG. 8 is a view illustrating a mobile terminal and an electronic device communicating with the mobile terminal in accordance with the present invention.

In relation to this, FIG. 8 illustrates an example showing the mobile terminal according to the present invention and an electronic device, for example, a Bluetooth headset, which performs wireless communication with the mobile terminal. Also, a wireless communication unit, a controller and the like of the Bluetooth headset described hereinafter may be components, which are the same as or similar to the wireless communication unit 110 and the controller 180 illustrated in FIG. 1A.

As illustrated in FIG. 8, the Bluetooth headset 200 and the mobile terminal 100 may be connected within a predetermined distance range through Bluetooth communication. Also, the wireless communication unit of the Bluetooth headset 200 may receive information related to a preset noise blocking level from the mobile terminal 100. The controller of the Bluetooth headset 200 may then block surrounding noise on the basis of the received information related to the noise blocking level during reproduction of a content. Also, the controller of the Bluetooth headset 200 may collect the surrounding noise information on the basis of a preset time, and provide the collected surrounding noise information to the wireless communication unit of the Bluetooth headset 200.

Accordingly, the mobile terminal 100 may adjust the preset noise blocking level on the basis of the surrounding noise information provided from the Bluetooth headset 200. For example, when a lot of noise are included in the surrounding noise information, the mobile terminal 100 may generate a control command for raising the noise blocking level. Also, when risk-related noise is included in the surrounding noise information, the mobile terminal 100 may generate a control command for lowering the noise blocking level.

The generated control command may be directly transferred to the Bluetooth headset 200 or a noise blocking signal corresponding to the noise blocking level changed according to the generated control command may be transmitted to the Bluetooth headset 200. As such, it can be possible to automatically change the noise blocking level according to the surrounding environment in a manner that a plurality of devices perform transmission and reception of signals through wireless communication (as well as wired communication).

The foregoing embodiments have illustrated that a user can recognize an external environment even during reproduction of a content by changing a noise blocking level or unlocking blocked noise upon a generation of a specific event. Hereinafter, description will be given of a control method of a mobile terminal for selectively clearing a sound that the user desires to hear when the user desires to clearly hear the sound among surrounding sounds or noise, with reference to FIG. 9.

First, referring to FIG. 9, the mobile terminal 100 according to this embodiment may set at least one noise blocking level of a plurality of noise blocking levels on the basis of a user input (S910). To this end, the mobile terminal 100 may first enter a setting mode for setting a desired specific noise blocking level on the basis of a user manipulation. When the desired noise blocking level is set, the mobile terminal 100 blocks surrounding noise according to the set noise blocking level during reproduction of a content (S920).

Meanwhile, the mobile terminal 100 may extract a specific sound by analyzing the surrounding noise, in response to a preset input signal sensed during an execution of a noise blocking mode (S930).

Here, the preset input signal is a user input for clearly hearing a specific sound or voice within the surrounding noise. Examples of the preset input signal may include a preset gesture input, a touch input applied to a specific key or the display nit 151, and a voice command input, and the like.

Also, the specific voice may preferably be extracted when a volume of an input voice exceeds a preset value and the input of the voice is maintained for a preset time. Also, the specific voice may be automatically extracted, but alternatively be implemented in a manner of scanning a plurality of voices included in the surrounding noise, clearing each of the scanned voices one by one, and extracting a voice selected through a user input.

When the specific voice is extracted, the controller 180 may amplify the same voice as the extracted specific voice and change the set noise blocking level such that the other noise can be gradually blocked (S940). Accordingly, the controller of the mobile terminal 100, for example, can clearly hear necessary sounds, such as a voice of a speaker, or a conversation with a person next to the user in a noisy place, from noise in a selective manner.

Meanwhile, the audio output module 152 of the mobile terminal 100 according to the embodiment disclosed herein can be implemented as a bone conduction speaker. In this instance, the mobile terminal 100 may receive the user's biometric signal detected through the bone conduction speaker.

When the user's biometric signal is detected through the bone conduction speaker, the controller 180 may determine whether the user is in a sleep state on the basis of the received biometric signal. When it is determined that the user is in the sleep state, the controller 180 may change the preset noise blocking level up to the highest level. Along with this, the controller 180 may pause the reproduced content or turn the volume down to a predetermined range. Accordingly, the mobile terminal 100 can help the user sleeping without interference with the surrounding noise.

As described above, according to embodiments of the present invention, while a content is reproduced, noise may be blocked at a user-set range and degree. Then, when an external environment changes, the user-set noise blocking range and degree can automatically be changed to be appropriate for the changed external environment, which may result in enhancing the user's safety from a risk and improving the user's convenience. Also, according to embodiments of the present invention, only a specific sound or voice that the user desires to hear can selectively be extracted from surrounding noise which is blocked according to an external environment, and processed to be clearly heard, thereby providing a noise blocking function more suitable for the user's complicated intent.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    an audio output speaker which outputs a sound corresponding to a reproduction of content;
    a sensor which detects a user's movement;
    a memory which stores a reference value related to the user's movement;
    a user interface which presents a plurality of noise blocking levels and sets at least one of the noise blocking levels on the basis of a user input; and
    a controller which;
        when the content is reproduced, blocks surrounding noise according to the set noise blocking level,
        when a sensed value corresponding to the detected user's movement exceeds the stored reference value, decreases a noise blocking level from the set noise blocking level such that a degree of the surrounding noise blocking is changed according to the detected user's movement,
        displays, on a display of the mobile terminal, visual information which indicates the change and the changed noise blocking level, and
        increases the decreased noise blocking level to the set noise blocking level when no user movement is detected during a predetermined time after decreasing the noise blocking level,
        wherein a decreased degree and a decreased range of blocking noise corresponding to the detected user's movement are differently determined based on the set noise blocking level.

2. The terminal of claim 1, wherein the controller turns down a volume of the sound corresponding to the reproduction of the content when the intensity of the signal corresponding to a detected specific event exceeds a maximum level threshold value of the plurality of noise blocking levels or is smaller than a minimum level threshold value of the plurality of noise blocking level.

3. The terminal of claim 1, wherein the controller, when the set noise blocking level is adjusted, controls an alarm corresponding to the adjusted set noise blocking level to be output.

4. The terminal of claim 3, wherein the alarm is at least one of vibration, a sound, or a message outputted on the mobile terminal or an external device connected to the mobile terminal.

5. The terminal of claim 1, wherein the plurality of noise blocking levels are categorized into a plurality of groups each having a different noise blocking degree and range for each level according to a preset reference, and
    wherein the controller controls a plurality of noise blocking levels corresponding to a selected one of the groups to be applied, when a specific event is detected.

6. The terminal of claim 1, wherein the speaker is a bone conduction speaker, and
    wherein the controller receives a user's biometric signal through the bone conduction speaker, and changes the set noise blocking level into a highest one of noise blocking levels when the biometric signal indicates that the user is in a sleep state.

7. The terminal of claim 1, wherein the controller restores the changed noise blocking level into the set noise blocking level when an end of a specific event is detected.

8. The terminal of claim 1, wherein the controller, when an end of a specific event is detected, changes the noise blocking level into a highest one or a lowest one of the noise blocking levels, scans an optimal noise blocking level corresponding to a degree of current surrounding noise, and resets noise blocking level according to the scan result.

9. The terminal of claim 1, wherein the user interface sets a specific sound, a specific voice or a specific word to be excluded from noise blocking, through another user input, and wherein the controller adjusts the set noise blocking level to a lowest level of the noise blocking levels when one of the set specific sound, the specific voice or the specific word is detected.

10. The terminal of claim 1, wherein the controller changes the set noise blocking level into a noise blocking level, which is obtained by averaging a first noise blocking level corresponding to a first event of a plurality of detected events and a second noise blocking level corresponding to a second event of the plurality of detected events, when a detected specific event is included in the plurality of detected events.

11. The terminal of claim 1, wherein the controller changes the set noise blocking level into one of a first noise blocking level corresponding to a first event of a plurality of detected events or a second noise blocking level corresponding to a second event of the plurality of detected events, on the basis of a preset event priority, when a detected specific event is included in the plurality of detected events.

12. The terminal of claim 1, wherein the controller extracts a specific voice by analyzing surrounding noise on the basis of a preset input signal, amplifies the specific voice, and changes the set noise blocking level such that other noise that is different from the specific voice is blocked.

13. The terminal of claim 1, wherein, when a specific event includes a sound associated with the a risk factor, the controller tracks the sound associated with the risk factor for a preset time, wherein the controller maintains the set noise blocking level when the sound including the risk factor is moving away from the terminal according to the tracking result.

14. A method for controlling a mobile terminal, the method comprising:

setting at least one noise blocking level of a plurality of noise blocking levels on a basis of a user input;

blocking surrounding noise according to the set noise blocking level, when a content is reproduced;

detecting, by a sensor of the mobile terminal, a user's movement while reproducing the content;

when a sensed value corresponding to the detected user's movement exceeds a reference value stored in a memory of the mobile terminal, decreasing a noise blocking level from the set noise blocking level such that a degree of the surrounding noise blocking is changed according to the detected user's movement;

displaying visual information which indicates the change and the changed noise blocking level on a display of the mobile terminal; and increasing the decreased noise blocking level to the set noise blocking level when no user movement is detected during a predetermined time after decreasing the noise blocking level, wherein a decreased degree and a decreased range of blocking noise corresponding to the detected user's movement are differently determined based on the set noise blocking level.

15. The method of claim 14, wherein a volume of a sound corresponding to reproducing the content is turned down, when the intensity of the signal corresponding to a detected specific event exceeds a maximum level threshold value of the plurality of noise blocking levels or smaller than a minimum level threshold value of the plurality of noise blocking levels.

16. The method of claim 14, further comprising outputting an alarm corresponding to the change in the set noise blocking level.

17. The method of claim 14, wherein a specific event corresponds to a specific voice, and wherein the method further comprises:

extracting the specific voice by analyzing surrounding noise on the basis of a preset input signal;

amplifying the specific voice; and changing the set noise blocking level such that other noise that is different from the specific voice is blocked.

* * * * *